(12) United States Patent
Saito

(10) Patent No.: US 12,488,607 B2
(45) Date of Patent: Dec. 2, 2025

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Takuya Saito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 356 days.

(21) Appl. No.: 18/173,854

(22) Filed: Feb. 24, 2023

(65) Prior Publication Data
US 2023/0281948 A1 Sep. 7, 2023

(30) Foreign Application Priority Data
Mar. 3, 2022 (JP) ................. 2022-032669

(51) Int. Cl.
*G06V 30/162* (2022.01)
*G06T 5/40* (2006.01)
*G06V 10/28* (2022.01)
*G06V 30/10* (2022.01)
*G06V 30/18* (2022.01)

(52) U.S. Cl.
CPC .......... *G06V 30/162* (2022.01); *G06T 5/40* (2013.01); *G06V 10/28* (2022.01); *G06V 30/10* (2022.01); *G06V 30/18086* (2022.01)

(58) Field of Classification Search
CPC .......... G06V 30/162; G06V 30/10; G06V 30/18086; G06V 10/28; G06T 5/40
See application file for complete search history.

(56) References Cited

U.S. PATENT DOCUMENTS

| 5,784,500 A * | 7/1998 | Homma .............. G06V 30/162 382/270 |
| 9,110,874 B2 * | 8/2015 | Tamiya ................. G06F 40/143 |
| 2014/0321716 A1 * | 10/2014 | Shiose ................ G06V 30/155 382/112 |
| 2015/0302243 A1 * | 10/2015 | Gross ..................... G06F 18/41 382/224 |

FOREIGN PATENT DOCUMENTS

| JP | H06325209 A | 11/1994 |
| JP | H09130610 A | 5/1997 |

* cited by examiner

*Primary Examiner* — Casey L Kretzer
(74) *Attorney, Agent, or Firm* — ROSSI, KIMMS & McDOWELL LLP

(57) ABSTRACT

An image processing apparatus capable of removing an unnecessary area from a scanned image and thereby making it easy to recognize a necessary area of the scanned image. The image processing apparatus includes a calculation unit that calculates a density value histogram based on an acquired scanned image, a setting unit that sets a necessary area density that has a predetermined value range around the most frequently appearing density value having the highest appearance frequency in the density value histogram, and sets a binarization threshold value based on the necessary area density, and a control unit that controls execution of binarization processing for correcting an area of the scanned image, in which density values are equal to or higher than the threshold value, to black, and correcting an area of the scanned image, in which density values are lower than the threshold value, to white.

7 Claims, 19 Drawing Sheets

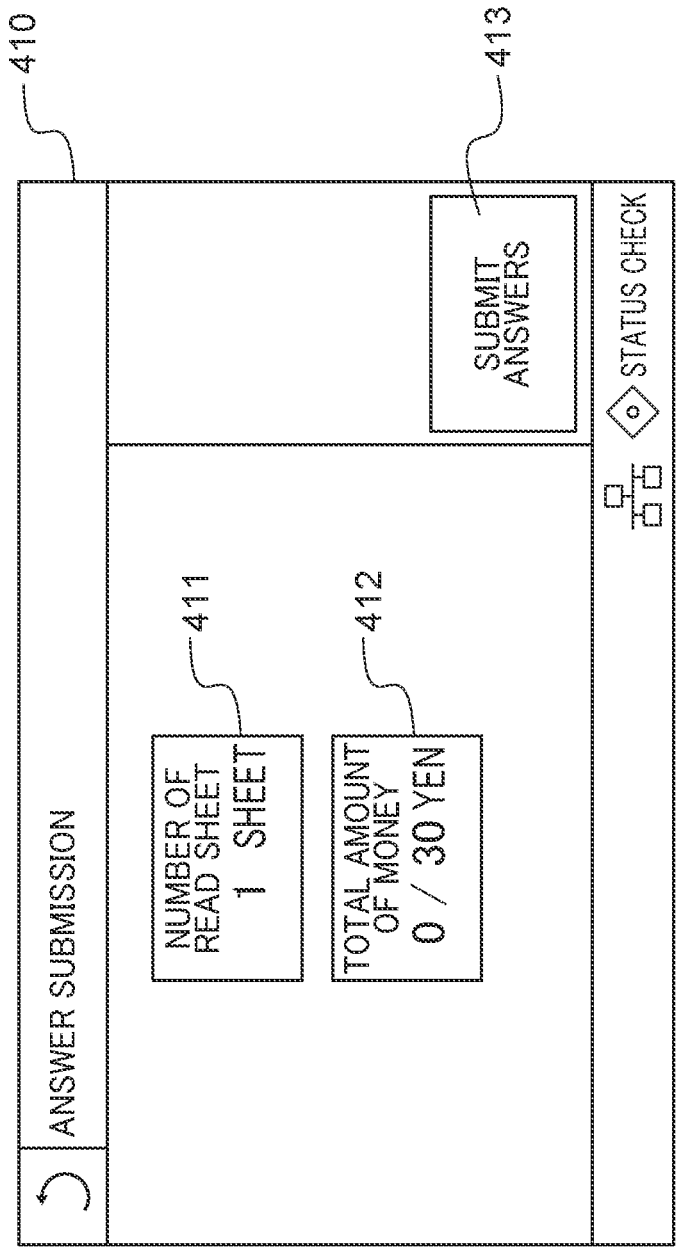

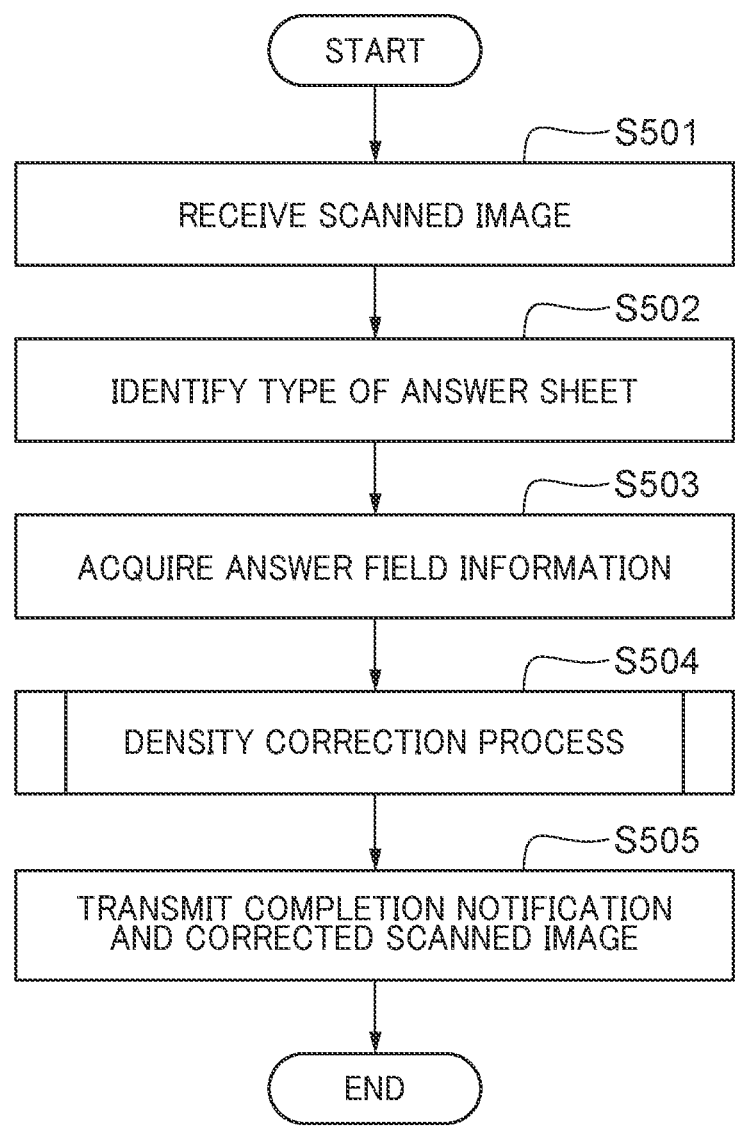

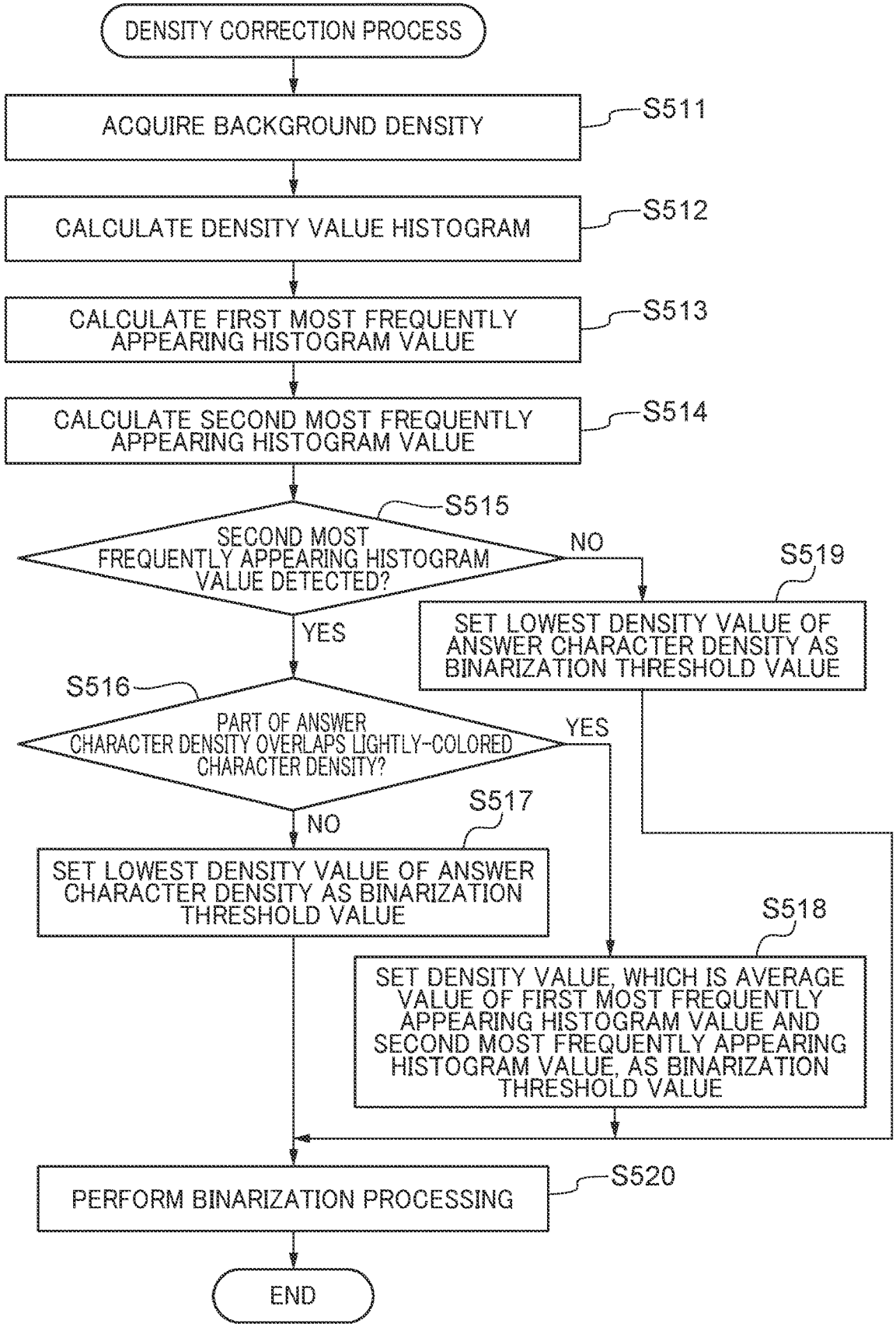

IMAGE PROCESSING APPARATUS, METHOD OF CONTROLLING IMAGE PROCESSING APPARATUS, AND STORAGE MEDIUM

BACKGROUND OF THE INVENTION

Field of the Invention

The present invention relates to an image processing apparatus, a method of controlling the image processing apparatus, and a storage medium.

Description of the Related Art

There has been known a system configured to submit an answer sheet for a test using a multifunction peripheral. In this system, the multifunction peripheral reads an answer sheet to generate a scanned image of the answer sheet, and transmits this scanned image to a management server. A grader grades answers using the scanned image stored in the management server. In the above system, image processing for clearly showing the scanned image is performed, and for example, a character area of the scanned image is made darker for correction (see Japanese Patent Laid-Open Publication No. H06-325209 and Japanese Patent Laid-Open Publication No. H09-130610). With this, the grader can easily recognize characters written in answer fields, and finds it easier to grade the answers.

However, if the character area of the scanned image is made darker for correction as described above, a problem is caused that even an unnecessary area for grading the answers, such as a trace of erasure by an eraser, is made darker.

SUMMARY OF THE INVENTION

The present invention provides an image processing apparatus which is capable of removing an unnecessary area from a scanned image and thereby making it easy to recognize a necessary area of the scanned image, a method of controlling the image processing apparatus, and a storage medium.

In a first aspect of the present invention, there is provided an image processing apparatus including a calculation unit configured to calculate a density value histogram based on an acquired scanned image, a setting unit configured to set a necessary area density that has a predetermined value range around a most frequently appearing density value having a highest appearance frequency in the density value histogram, and set a threshold value for binarization based on the necessary area density, and a control unit configured to control execution of binarization processing for correcting an area of the scanned image, in which density values are equal to or higher than the threshold value, to black, and correcting an area of the scanned image, in which density values are lower than the threshold value, to white.

In a second aspect of the present invention, there is provided a method of controlling an image processing apparatus, including calculating a density value histogram based on an acquired scanned image, setting a necessary area density that has a predetermined value range around a most frequently appearing density value having a highest appearance frequency in the density value histogram, and setting a threshold value for binarization based on the necessary area density, and controlling execution of binarization processing for correcting an area of the scanned image, in which density values are equal to or higher than the threshold value, to black, and correcting an area of the scanned image, in which density values are lower than the threshold value, to white.

According to the present invention, it is possible to remove an unnecessary area from a scanned image and thereby make it easy to recognize a necessary area of the scanned image.

Further features of the present invention will become apparent from the following description of exemplary embodiments (with reference to the attached drawings).

BRIEF DESCRIPTION OF THE DRAWINGS

FIGS. 4A to 4F are diagrams showing respective examples of screens displayed on a console section appearing in FIG. 2A.

FIG. 5A is a flowchart of a scanned image correction process performed by the image processing server appearing in FIG. 1.

FIG. 5B is a flowchart of a density correction process performed in a step of the scanned image correction process in FIG. 5A.

FIGS. 9A to 9C are diagrams useful in explaining generation of a difference image in a step of the density correction process in FIG. 8B.

DESCRIPTION OF THE EMBODIMENTS

The present invention will now be described in detail below with reference to the accompanying drawings showing embodiments thereof.

Figure 1:
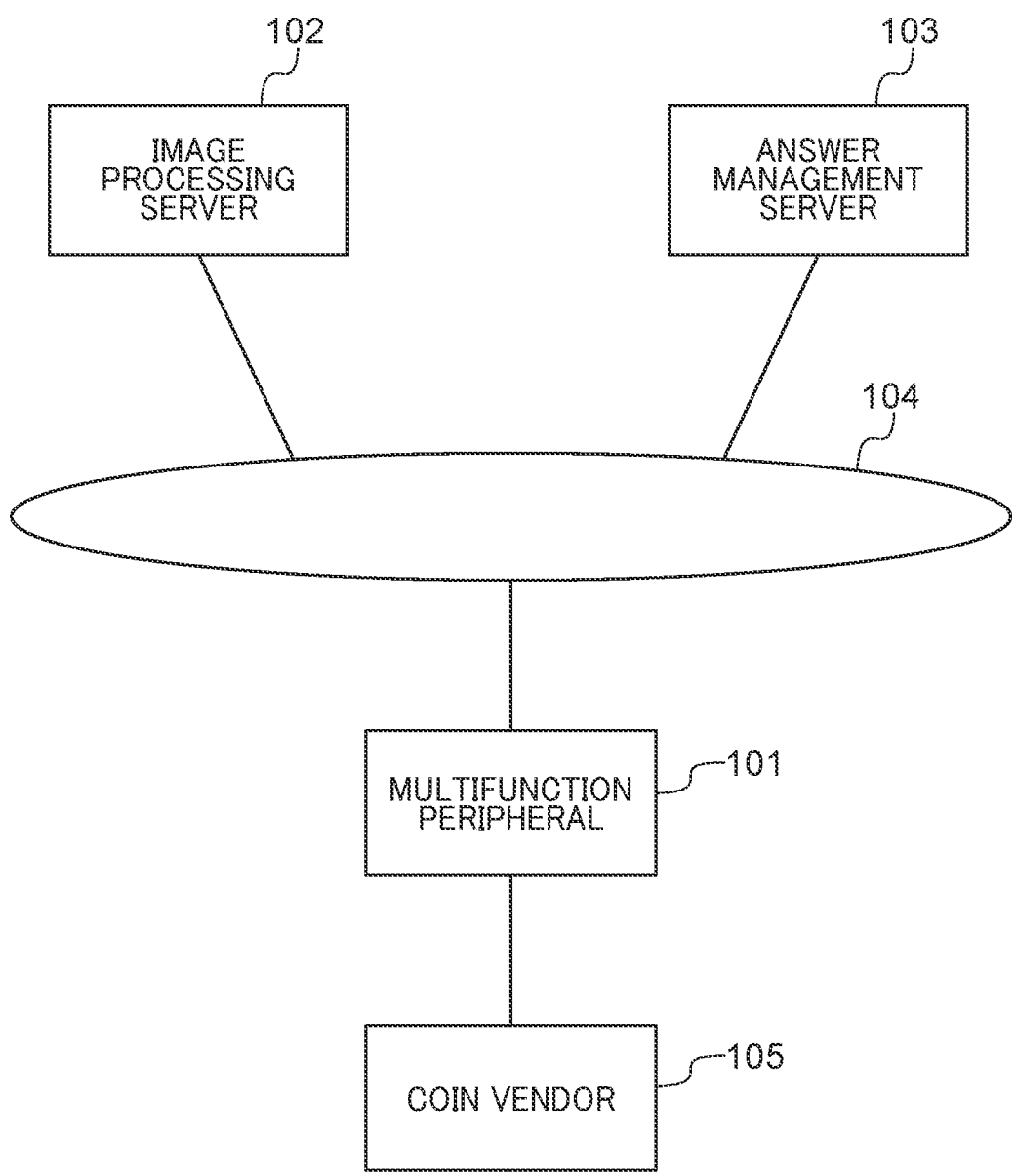
FIG. 1 is a diagram showing the entire configuration of an image processing system according to an embodiment of the present invention.

FIG. 1 is a diagram showing the entire configuration of an image processing system 100 according to the present embodiment. Referring to FIG. 1, the image processing system 100 includes a multifunction peripheral 101, an image processing server 102 as an image processing apparatus, and an answer management server 103. Although in the present embodiment, a description will be given of a configuration in which the image processing system 100 includes a multifunction peripheral that reads an original, by way of example, the apparatus that reads an original is not limited to the multifunction peripheral, but may be an apparatus, such as a scanner, which does not have a printing function. The multifunction peripheral 101, the image processing server 102, and the answer management server 103 are connected to each other via a network 104. Further, a coin vendor 105 as a billing device is connected to the multifunction peripheral 101. Further, although in the present embodiment, a description will be given of a configuration in which the coin vendor 105 is connected to the multifunction peripheral 101, by way of example, this is not limitative, but there may be employed a configuration in which the coin vendor 105 is not connected to the multifunction peripheral 101.

In the image processing system 100, the multifunction peripheral 101 reads a set answer sheet to generate a scanned image of the answer sheet, and transmits this scanned image to the image processing server 102 via the network 104. The image processing server 102 analyzes the scanned image acquired from the multifunction peripheral 101, corrects the scanned image such that an unnecessary area with e.g. a trace of erasure by an eraser is prevented from remaining in the scanned image, and transmits the corrected scanned image to the multifunction peripheral 101. The multifunction peripheral 101 displays the corrected scanned image on a console section 205, described hereinafter with reference to FIG. 2, and transmits the corrected scanned image to the answer management server 103 according to a submission instruction from a user.

Figure 2A:
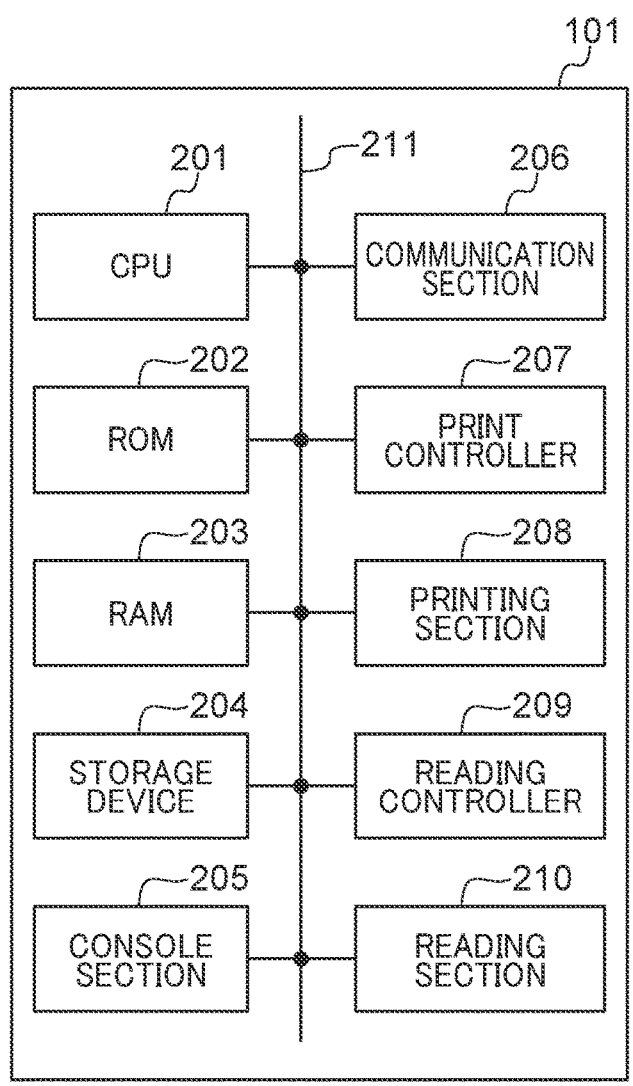
FIG. 2A is a schematic block diagram of a multifunction peripheral appearing in FIG. 1.
Figure 2B:
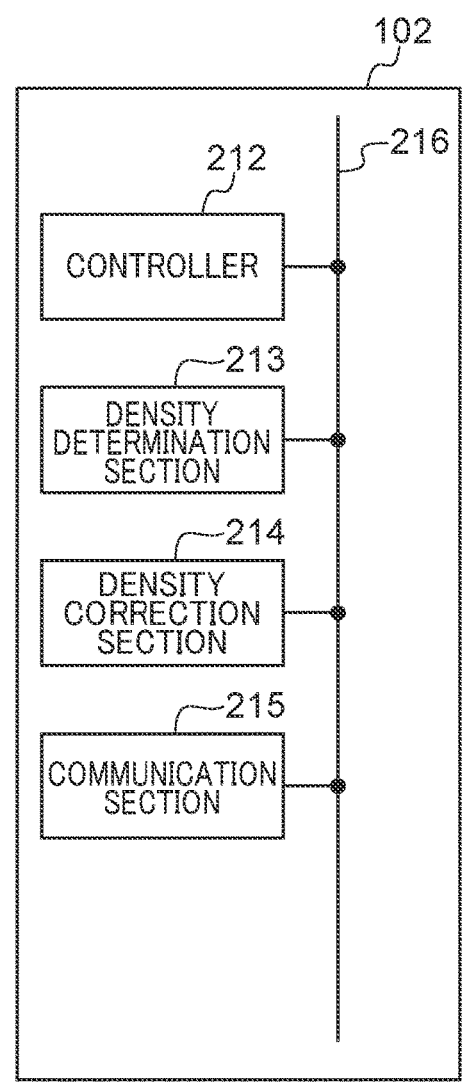
FIG. 2B is a schematic block diagram of an image processing server appearing in FIG. 1.

FIGS. 2A and 2B are schematic block diagrams of the multifunction peripheral 101 and the image processing server 102 appearing in FIG. 1, respectively. FIG. 2A shows the configuration of the multifunction peripheral 101. Referring to FIG. 2A, the multifunction peripheral 101 is comprised of a CPU 201, a ROM 202, a RAM 203, a storage device 204, the console section 205, a communication section 206, a print controller 207, a printing section 208, a reading controller 209, and a reading section 210, which are connected to each other via a data bus 211.

The CPU 201 controls the overall operation of the multifunction peripheral 101. The ROM 202 is implemented by a flash memory, and stores programs executed by the CPU 201 and so forth. The RAM 203 is a volatile memory, and is used as a work area for the CPU 201 and further as an area for temporarily storing data. The storage device 204 is a nonvolatile memory, and is, for example, a hard disk drive (HDD) or a solid state drive (SSD). The storage device 204 stores the scanned image generated by the reading section 210, and the like.

The console section 205 receives a user operation instruction, and further displays a variety of information concerning the multifunction peripheral 101. For example, the console section 205 receives from the user an instruction for scanning an original, such as an answer sheet, and a submission instruction for transmitting a scanned image of the answer sheet corrected by the image processing server 102 to the answer management server 103. Further, the console section 205 displays the scanned image of the answer sheet corrected by the image processing server 102.

The communication section 206 performs communication with the image processing server 102 and the answer management server 103 via the network 104. The print controller 207 generates print data by performing image processing on image data, such as the acquired scanned image. The printing section 208 prints the print data generated by the print controller 207 on a recording medium, such as a sheet. The reading controller 209 performs processing according to e.g. settings for reading an original. The reading section 210 reads an original to generate a scanned image of the original.

FIG. 2B shows the configuration of the image processing server 102. Referring to FIG. 2B, the image processing server 102 is comprised of a controller 212, a density determination section 213, a density correction section 214, and a communication section 215, which are connected to each other via a data bus 216.

The controller 212 is comprised of a CPU, a ROM, and a RAM, none of which are shown, and controls the overall operation of the image processing server 102. The density determination section 213 analyzes the scanned image acquired from the multifunction peripheral 101, and determines a density of a character area of the scanned image. The density correction section 214 performs binarization processing for correcting an area of the scanned image, whose density value is equal to or higher than a threshold value for binarization (binarization threshold value), referred to hereinafter, to black, and correcting an area of the scanned image, which has a density value lower than the binarization threshold value, to white. The communication section 215 communicates with the multifunction peripheral 101 and so forth via the network 104.

Figure 3:
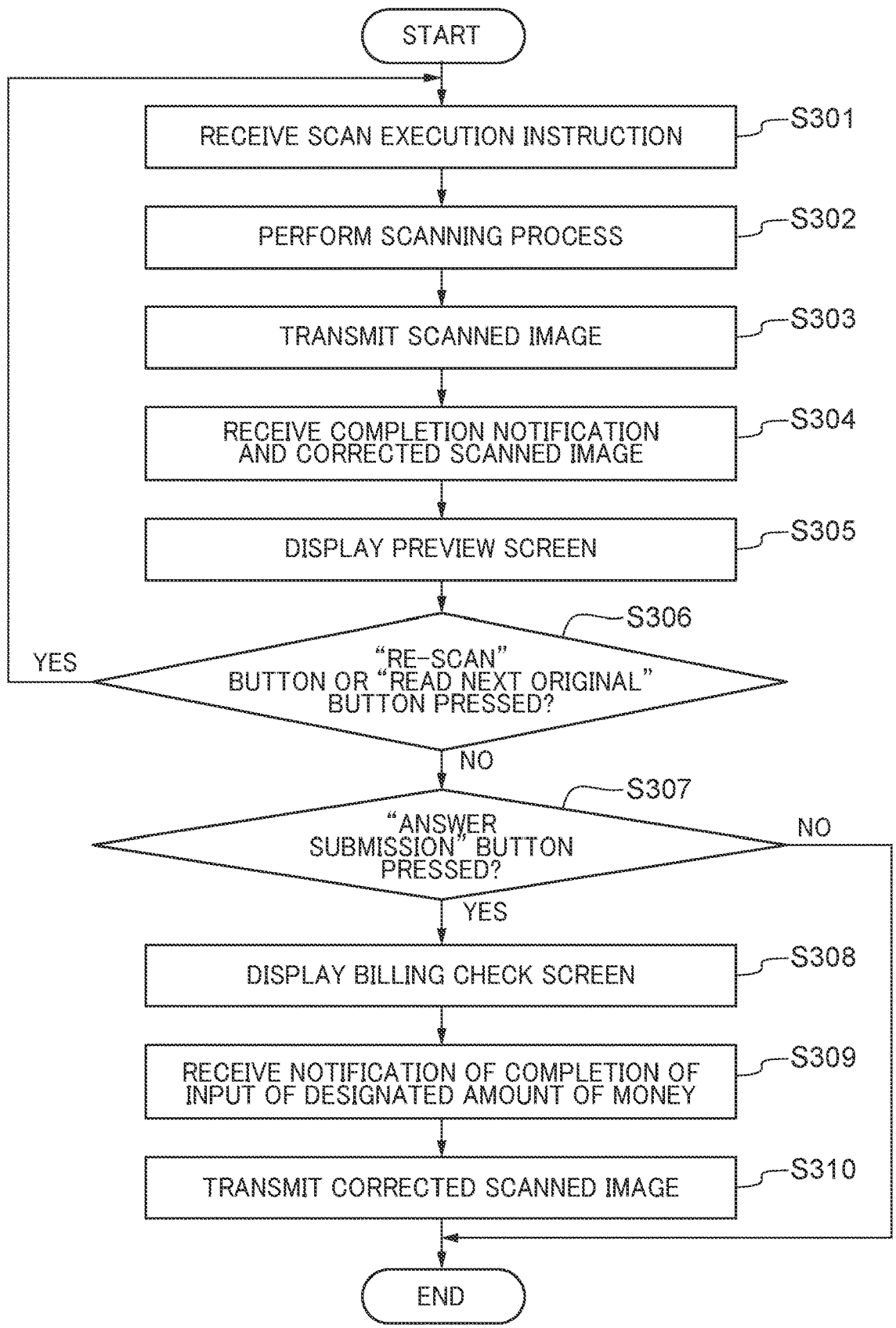
FIG. 3 is a flowchart of an answer submission control process performed by the multifunction peripheral appearing in FIG. 1.
Figure 4A:
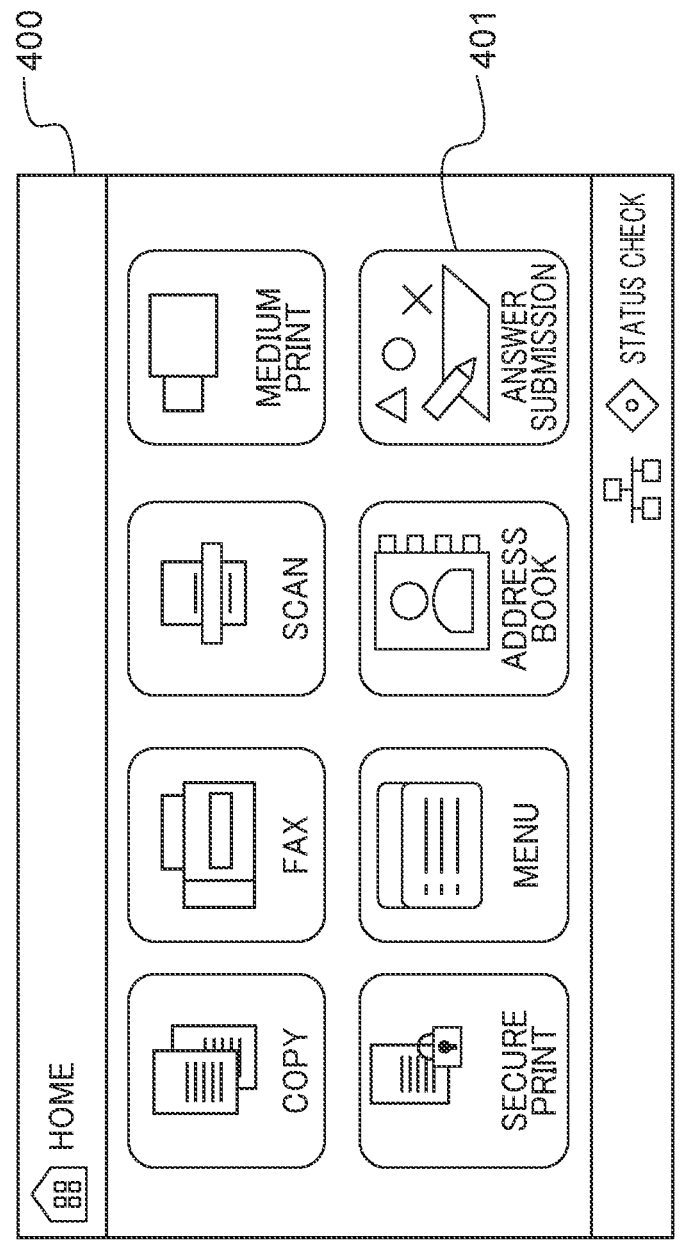
Figure 4B:
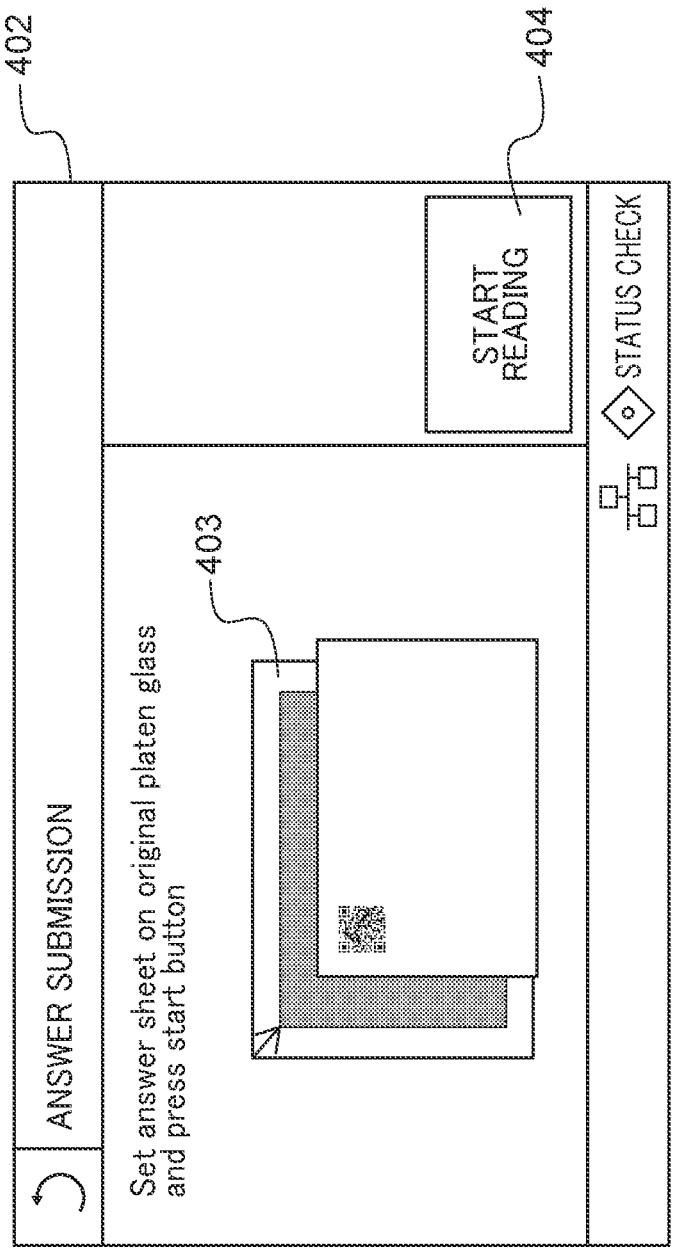

FIG. 3 is a flowchart of an answer submission control process performed by the multifunction peripheral 101 appearing in FIG. 1. The answer submission control process is realized by the CPU 201 that loads a program stored in the ROM 202 into the RAM 203, and executes the program. In the present embodiment, when the user presses an answer submission button 401 on a menu screen 400 shown in FIG. 4A, which is displayed on the console section 205, the screen of the console section 205 is switched to a scan screen 402 shown in FIG. 4B. On the scan screen 402, an example of setting an answer sheet on an original platen glass 403 of the multifunction peripheral 101 is displayed. When the user sets an answer sheet on the original platen glass 403 based on the setting example, and presses a reading start button 404, the answer submission control process in FIG. 3 is executed.

Referring to FIG. 3, first, the CPU 201 receives a scan execution instruction corresponding to the press of the reading start button 404, from the console section 205 (step S301). Then, the CPU 201 performs a scanning process of the answer sheet (step S302). More specifically, the CPU 201 instructs the reading section 210 to start to scan the answer sheet via the reading controller 209. With this, the reading section 210 reads the set answer sheet, and generates a scanned image of the answer sheet. Then, the CPU 201 transmits the scanned image generated by the reading section 210 to the image processing server 102 (step S303). The image processing server 102, which has received the scanned image, performs a scanned image correction process, described hereinafter with reference to FIG. 5A, and corrects the scanned image such that an unnecessary area with e.g. a trace of erasure by an eraser is prevented from remaining in the scanned image. Further, the image processing server 102 transmits to the multifunction peripheral 101 a completion notification indicating completion of the correction of the scanned image and the corrected scanned image.

Figure 4C:
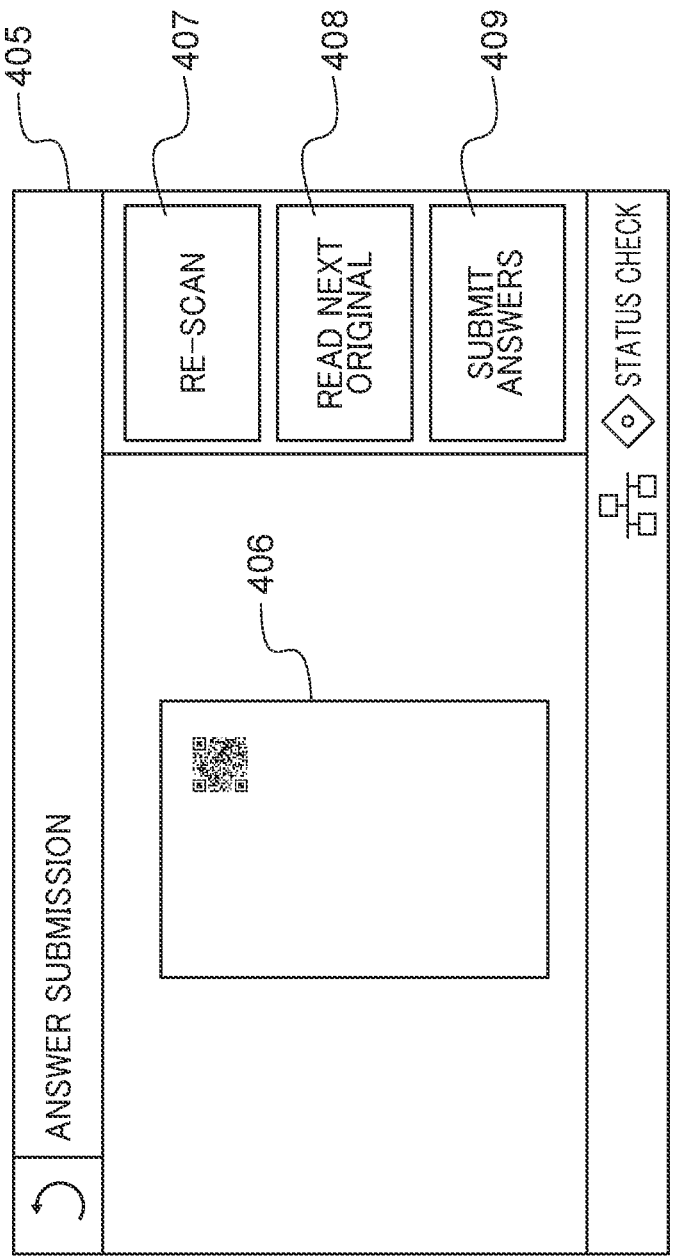

Upon receipt of the completion notification and the corrected scanned image from the image processing server 102 (step S304), the CPU 201 displays a preview screen 405, appearing in FIG. 4C, on the console section 205 (step S305). A preview image 406 of the corrected scanned image received from the image processing server 102 is displayed on the preview screen 405. Further, a "re-scan" button 407, a "read next original" button 408, and a "submit answers" button 409 are displayed on the preview screen 405. The "re-scan" button 407 is for instructing the reading section 210 to re-read the answer sheet read in the step S302 without adding to the number of the read answer sheets. The "read next original" button 408 is for instructing the reading section 210 to add to the number of the read answer sheets and read a next original. The "submit answers" button 409 is for instructing submission of the corrected scanned image.

The CPU 201 determines whether or not the "re-scan" button 407 or the "read next original" button 408 on the preview screen 405 has been pressed by the user (step S306). If it is determined in the step S306 that the "re-scan" button 407 or the "read next original" button 408 on the preview screen 405 has been pressed by the user, the process returns to the step S301. For example, if the "re-scan" button 407 has been pressed by the user, the CPU 201 performs the scanning process again on the answer sheet read in the step S302 without adding to the number of the read answer sheets. Further, if the "read next original" button 408 has been pressed by the user, the CPU 201 adds to the number of the read answer sheets, and performs a scanning process of an answer sheet newly set on the original platen glass, i.e. another answer sheet different from the answer sheet read in the step S302.

If it is determined in the step S306 that neither the "re-scan" button 407 nor the "read next original" button 408 on the preview screen 405 has been pressed, the process proceeds to a step S307. In the step S307, the CPU 201 determines whether or not the "submit answers" button 409 on the preview screen 405 has been pressed by the user.

When a predetermined time period elapses in a state in which it is determined in the step S307 that the "submit answers" button 409 on the preview screen 405 has not been pressed by the user, the present process is terminated. If it is determined in the step S307 that the "submit answers" button 409 on the preview screen 405 has been pressed by the user, the CPU 201 displays a billing check screen 410 shown in FIG. 4D on the console section 205 (step S308). On the billing check screen 410, the number of the read answer sheets, denoted by reference numeral 411, an amount of input money, denoted by reference numeral 412, and a "answer submission" button 413 are displayed. After the CPU 201 has received notification of completion of input of a designated amount of money from the coin vendor 105 (step S309), and when the user has pressed the "answer submission" button 413 on the billing check screen 410, the process proceeds to a step S310. In the step S310, the CPU 201 transmits the corrected scanned image to the answer management server 103, followed by terminating the present process.

Figure 4E:
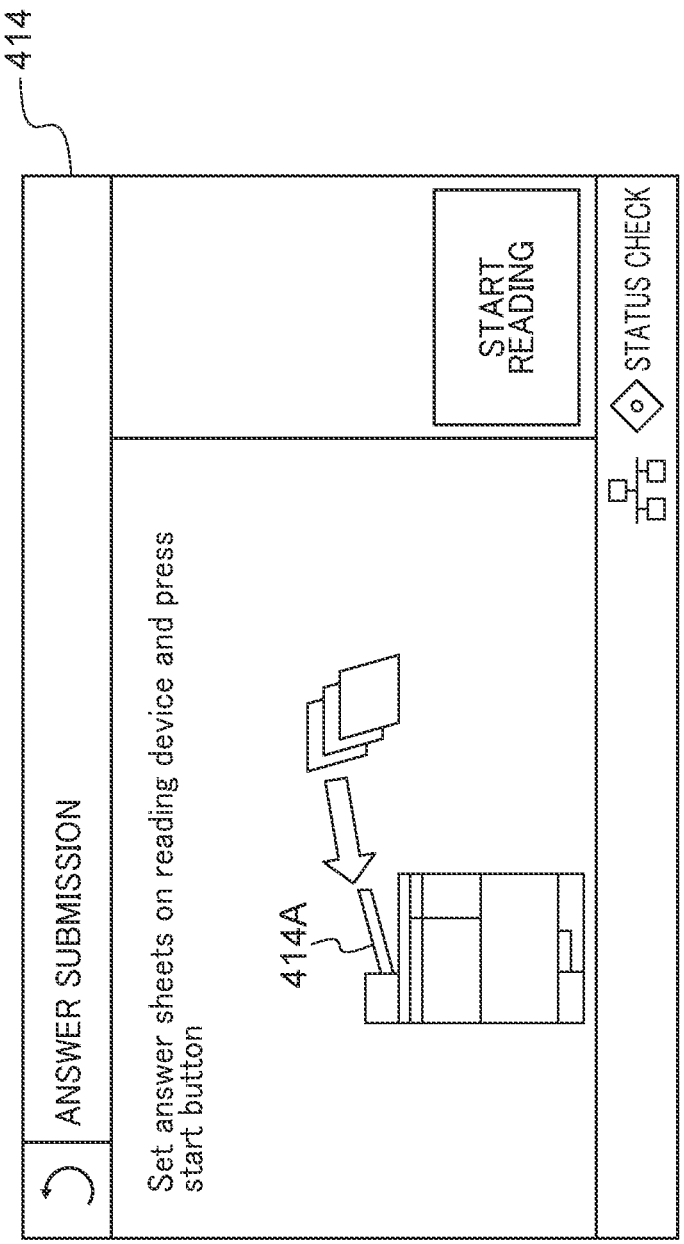

Note that in the present embodiment, when the answer submission button 401 has been pressed, a scan screen 414 in FIG. 4E, on which an example of setting answer sheets on an ADF 414A of the multifunction peripheral 101 is displayed, may be displayed on the console section 205. Note that ADF is an abbreviation of Automatic Document Feeder.

Figure 4F:
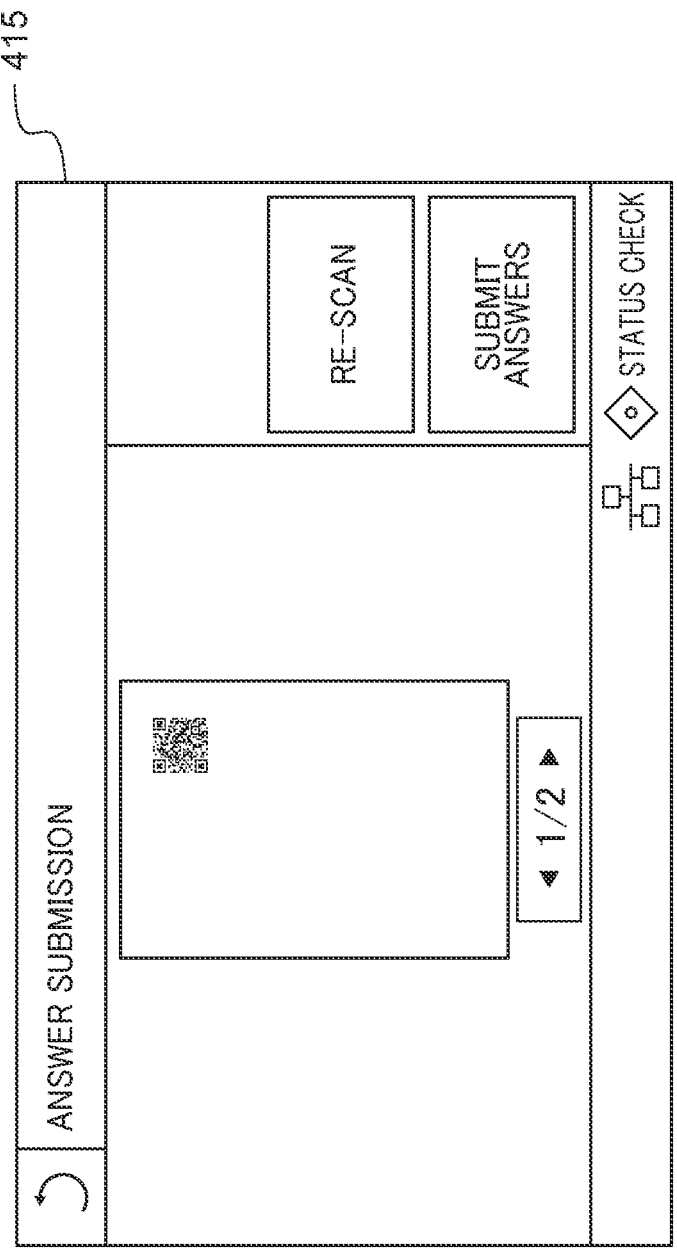

Further, in the configuration in which answer sheets are set on the ADF, in the step S305, the CPU 201 may display on the console section 205 a preview screen 415 shown in FIG. 4F, which is configured to be capable of switching between pages of preview images of a plurality of read answer sheets.

FIG. 5A is a flowchart of the scanned image correction process performed by the image processing server 102 appearing in FIG. 1. The scanned image correction process in FIG. 5A is realized by the controller 212 of the image processing server 102, specifically, by the CPU that loads a program stored in the ROM into the RAM and executes the loaded program.

Referring to FIG. 5A, the controller 212 receives the scanned image from the multifunction peripheral 101 (step S501). This scanned image is one transmitted from the multifunction peripheral 101 in the above-mentioned step S303. Then, the controller 212 identifies a type of the answer sheet (step S502). In the present embodiment, code information, such as a QR code (registered trademark), which includes information for identifying the type of the answer sheet, is printed on the answer sheet. The controller 212 identifies the type of the answer sheet based on a QR code on the scanned image received in the step S501.

Then, the controller 212 acquires answer field information (step S503). The answer field information is coordinate information indicating the location of each answer field of the answer sheet. In the present embodiment, the image processing server 102 stores in advance a plurality of pieces of answer field information respectively associated with types of answer sheets. In the step S503, the controller 212 acquires answer field information associated with the type of the answer sheet identified in the step S502, from the plurality of pieces of answer field information stored in the image processing server 102. Then, the controller 212 performs a density correction process, described hereinafter with reference to FIG. 5B (step S504), and corrects the above-mentioned scanned image such that an unnecessary area with e.g. a trace of erasure by an eraser is prevented from remaining in the scanned image. Upon completion of correction of the scanned image, the controller 212 transmits a completion notification and the corrected scanned image to the multifunction peripheral 101 (step S505), followed by terminating the present process.

FIG. 5B is a flowchart of the density correction process in the step S504 in FIG. 5A.

Referring to FIG. 5B, the controller 212 identifies answer field areas of the scanned image received in the step S501 based on the answer field information acquired in the step S503, and acquires a background density from areas other than the answer field areas (step S511). In the step S511, the controller 212 calculates the background density based on an average density of the areas other than the answer field areas. Note that the areas other than the answer field areas may be a single area or a plurality of areas. Then, the controller 212 subtracts the background density from the whole answer sheet area of the scanned image.

Figure 6A:
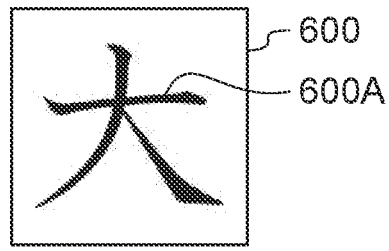
FIGS. 6A to 6E are diagrams useful in explaining calculation of a density value histogram in steps of the density correction process in FIG. 5B.
Figure 6B:
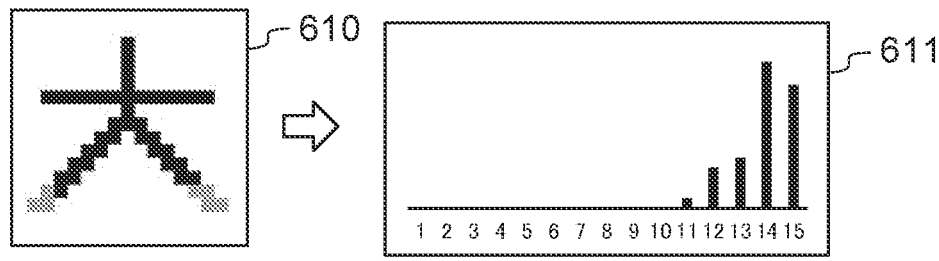
Figure 6C:
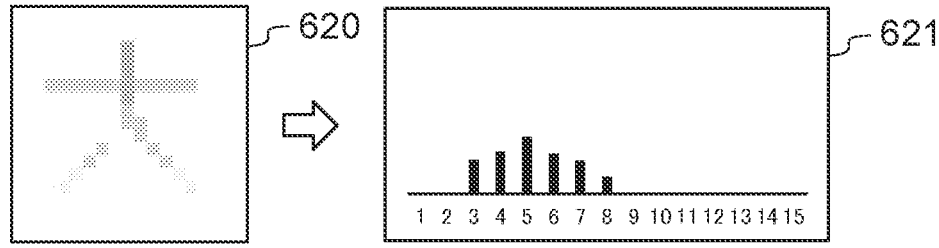

Then, the controller 212 calculates a density value histogram for each answer field area of the scanned image (step S512). For example, when a kanji character 600A shown in FIG. 6A is decomposed into units of pixels, an image 610 shown in FIG. 6B or an image 620 shown in FIG. 6C is obtained according to the density of the kanji character 600A. Note that a density value histogram 611 is calculated from the image 610 having the kanji character 600A written in dark color, and a density value histogram 621 is calculated from the image 620 having the kanji character 600A written in light color. These density value histograms 611 and 621 have 15 levels of gradation, by way of example, and indicate the frequency of appearance of each density value. Further, in an image 630 shown in FIG. 6D, in addition to the kanji character 600A written in dark color, there remain a lightly colored character, which is a trace of erasure by an eraser. Note that a density value histogram 631 is calculated from the image 630.

Figure 6D:

Then, the controller 212 executes steps S513 to S519, described hereinafter, on an answer field area-by-answer field area basis. More specifically, the controller 212 acquires a density value histogram of one answer field area from a plurality of density value histograms calculated in the step S512. The controller 212 calculates a first most frequently appearing histogram value (most frequently appearing density value), which is a density value highest in appearance frequency in the acquired density value histogram (step S513). When the density value histogram 631 in FIG. 6D is taken as an example, the first most frequently appearing histogram value is a density value of 14. In a case where there are a plurality of density values highest in the appearance frequency in the acquired density value histogram, the highest density value of the density values is set as the first most frequently appearing histogram value. It is considered that a character written as an answer is highest in density and highest in appearance frequency in the answer field, and hence, in the present embodiment, the density value "14", which is the first most frequently appearing histogram value, and ambient density values thereabout are set as an answer character density 632 (necessary area density). In the present embodiment, for example, density values in a range of plus and minus 2 of the first most frequently appearing histogram value are set as the answer character density 632.

Then, the controller 212 calculates a second most frequently appearing histogram value (frequently appearing density value), which is a density value, highest in appearance frequency, of density values except the answer character density 632 in the acquired density value histogram (step S514). When the density value histogram 631 in FIG. 6D is taken as an example, the second most frequently appearing histogram value is a density value of 5. The controller 212 sets the density value 5 of the second most frequently appearing histogram value and ambient density values therearound as a lightly colored character density 633 (unnecessary area density). It is considered that in the answer field, e.g. the density of a trace of erasure by an eraser is not so high as the density of the answer character density 632, but the appearance frequency of the trace is high to some degree, and hence in the present embodiment, for example, density values within a range of plus and minus 2 of the second most frequently appearing histogram value are set as the lightly colored character density 633. Then, the controller 212 determines whether or not the second most frequently appearing histogram value has been detected (step S515).

If it is determined in the step S515 that the second most frequently appearing histogram value has been detected, the process proceeds to a step S516. In the step S516, the controller 212 determines whether or not part of the answer character density 632 overlaps the lightly colored character density 633. If it is determined in the step S516 that no part of the answer character density 632 overlaps the lightly colored character density 633, the controller 212 sets the lowest density value in the answer character density 632 as a binarization threshold value (step S517). This binarization threshold value has a higher density value than the second most frequently appearing histogram value. With this, in the scanned image, an area in which density values are lower than the binarization threshold value, such as an area including the second most frequently appearing histogram value corresponding to the density value of the trace of erasure by an eraser or the like, can be corrected to white. Then, the process proceeds to a step S520, described hereinafter.

If it is determined in the step S516 that part of the answer character density 632 overlaps the lightly colored character density 633, the process proceeds to a step S518. In the step S518, the controller 212 sets a density value, which is an average value of the first most frequently appearing histogram value and the second most frequently appearing histogram value, as a binarization threshold value. This binarization threshold value as well has a higher density value than the second most frequently appearing histogram value. With this, in the scanned image, an area in which density values are lower than the binarization threshold value, such as an area including the second most frequently appearing histogram value corresponding to the density value of a trace of erasure by an eraser or the like, can be corrected to white. Then, the process proceeds to the step S520, described hereinafter.

Figure 6E:
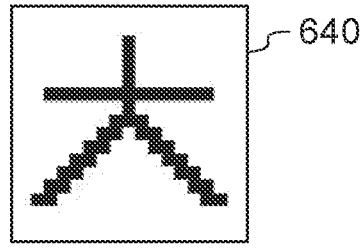

If it is determined in the step S515 that the second most frequently appearing histogram value has not been detected, the controller 212 sets a density value lowest in the answer character density 632 as a binarization threshold value (step S519). In the present embodiment, the above-described steps S513 to S519 are executed on all the identified answer field areas. When the binarization threshold values are set for all the identified answer field areas, the controller 212 performs binarization processing based on the set binarization threshold values (step S520). With this, a corrected image 640 in FIG. 6E, for example, is obtained which is formed by correcting an area in which density values are equal to or higher than a set binarization threshold value to black, and an area in which density values are lower than the set binarization threshold value to white. After that, the present process is terminated.

Figure 7:
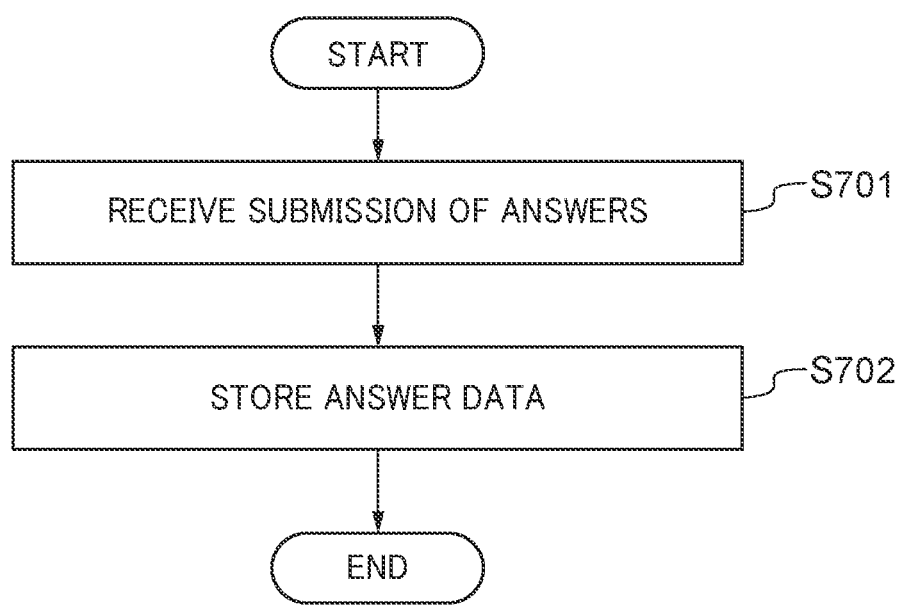
FIG. 7 is a flowchart of an answer reception process performed by an answer management server appearing in FIG. 1.

FIG. 7 is a flowchart of an answer reception process performed by the answer management server 103 appearing in FIG. 1.

Referring to FIG. 7, the answer management server 103 receives submission of an image of an answer sheet from the multifunction peripheral 101 (step S701). More specifically, the answer management server 103 receives a corrected scanned image from the multifunction peripheral 101. Then, the answer management server 103 stores the corrected scanned image received from the multifunction peripheral 101, as answer data (step S702), followed by terminating the present process.

According to the above-described embodiment, the answer character density 632 is set which has a predetermined value range around the first most frequently appearing histogram value having the highest appearance frequency in the density value histogram, and based on the answer character density 632, the binarization threshold value is set. The scanned image is subjected to binarization processing for correcting an area in which density values are equal to or higher than the binarization threshold value to black, and correcting an area in which density values are lower than the binarization threshold value to white. With this, it is possible to remove an unnecessary area from the scanned image and thereby make it easy to recognize a necessary area of the scanned image.

Further, in the above-described embodiment, the scanned image is generated by reading an answer sheet. This makes it possible to remove a lightly colored area with a trace of erasure by an eraser or the like from the scanned image of the answer sheet and thereby make it easy to recognize an area with a character or the like written in dark color as an answer.

Although the present invention has been described using the above-described embodiment, the present invention is not limited to the above-described embodiment. For example, the density value histogram may be calculated based on a difference image obtained by removing ruled line information from the received scanned image.

Ruled lines are sometimes included in an answer sheet for a description problem or the like which requires an answer to be written using not more than a designated number of characters. If the above-described scanned image correction process in FIG. 5A is performed on a scanned image generated by reading an answer sheet including ruled lines, as mentioned above, the density correction process in FIG. 5B is affected by the density value of the ruled lines, which sometimes hinders execution of the intended correction.

To cope with this problem, in the present embodiment, a density value histogram is calculated based on a difference image obtained by removing ruled line information from the received scanned image.

Figure 8A:
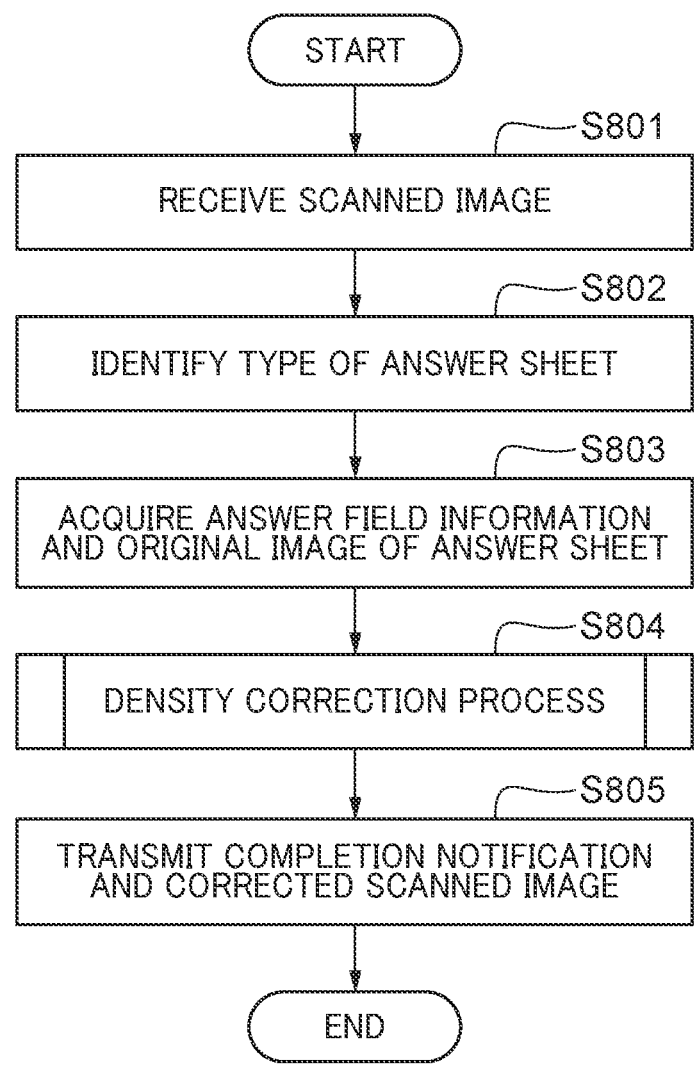
FIG. 8A is a flowchart of a variation of the scanned image correction process in FIG. 5A.

FIG. 8A is a flowchart of a variation of the scanned image correction process in FIG. 5A. Similar to the scanned image correction process in FIG. 5A, the scanned image correction process in FIG. 8A is also realized by the controller 212 of the image processing server 102, specifically, by the CPU that loads a program stored in the ROM into the RAM, and executes the loaded program. Note that the scanned image correction process in FIG. 8A is similar to the scanned image correction process in FIG. 5A, and hence the following description is given particularly of different points from the scanned image correction process in FIG. 5A.

Referring to FIG. 8A, the controller 212 executes steps S801 and S802, which are similar to the steps S501 and S502. Then, the controller 212 acquires answer field information and an original image of an answer sheet, based on an identified type of the answer sheet (step S803). Note that in the present embodiment, the image processing server 102 stores in advance original images of a plurality of answer sheets corresponding to types of answer sheets, respectively. Then, the controller 212 performs a density correction process, described in detail hereafter with reference to FIG. 8B (step S804).

Figure 8B:
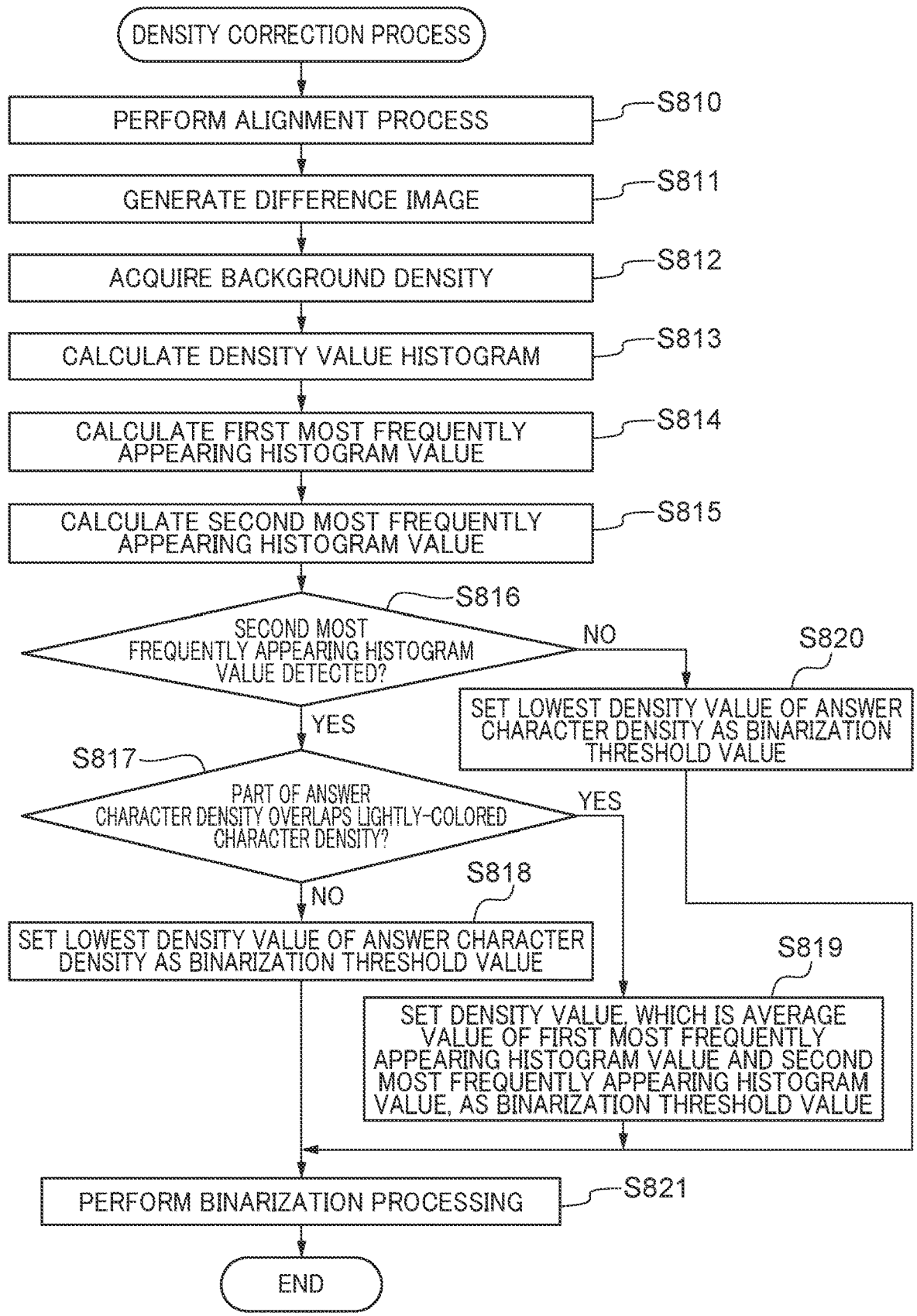
FIG. 8B is a flowchart of a variation of the density correction process, which is performed in a step of the scanned image correction process in FIG. 8A.
Figures 9A, 9B, 9C:
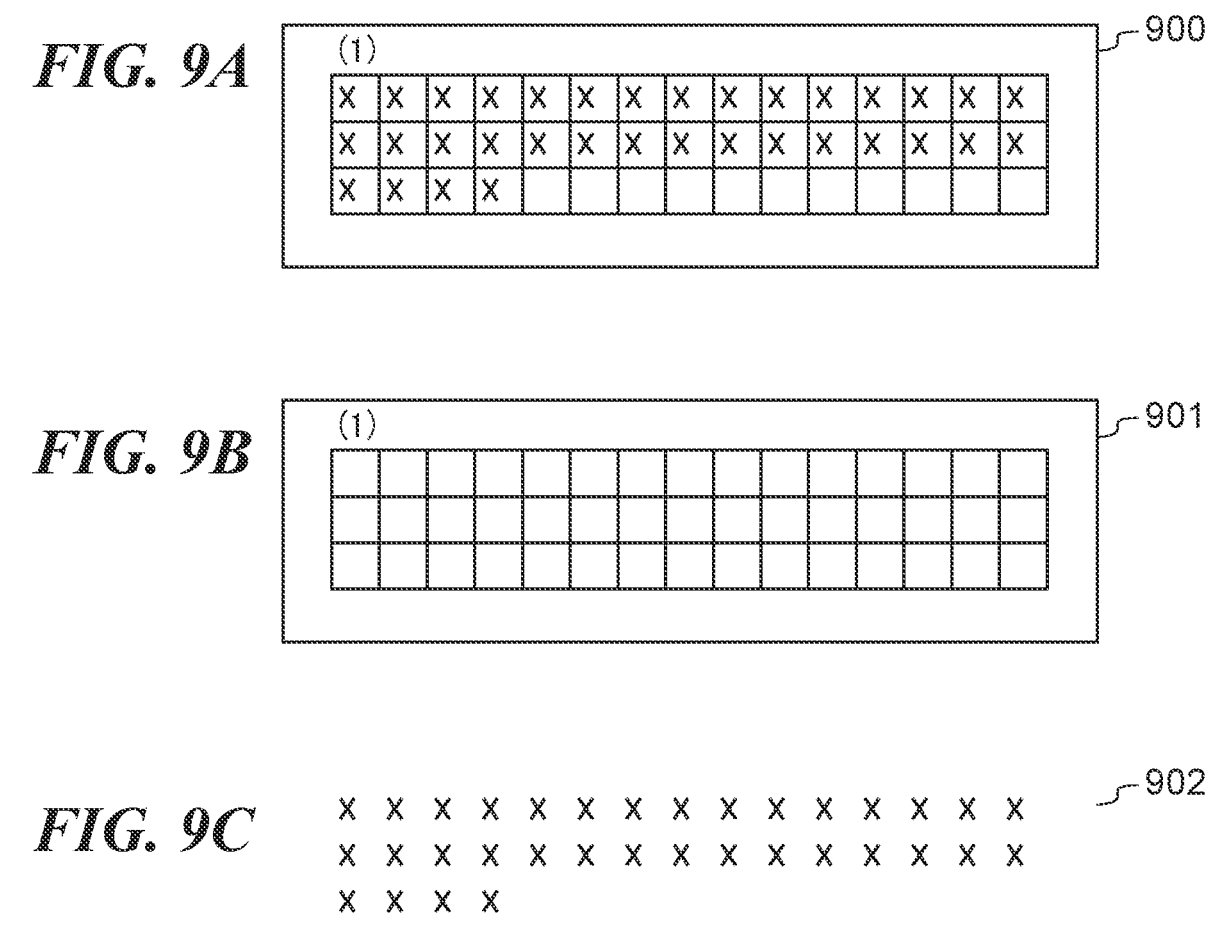

Referring to FIG. 8B, in a step S810, the controller 212 performs an alignment process of the received scanned image. More specifically, the controller 212 corrects the tilt and expansion/contraction of the scanned image with reference to the original image, by using a QR code of the scanned image. Then, the controller 212 generates a difference image between the aligned scanned image and the original image (step S811). Specifically, in the step S811, the controller 212 generates a difference image 902 shown in FIG. 9C based on e.g. a scanned image 900 shown in FIG. 9A and an original image 901 shown in FIG. 9B. Then, based on the difference image 902, the controller 212 executes steps S812 to S821, which are similar to the above-described steps S511 and S520. Then, the controller 212 executes a step S805 in FIG. 8A, which is similar to the step S505, followed by terminating the scanned image correction process.

The density value histogram is calculated based on the difference image obtained by removing the ruled line information from the received scanned image, whereby it is possible to prevent performance of the intended correction from being hindered by being affected by the density value of the ruled lines.

Further, in the above-described embodiment, whether or not to perform the binarization processing may be controlled based on an answer format of the answer sheet.

Tests have a variety of types of answer formats, such as a mark sheet format in which marks are to be filled in, a format in which only symbols are to be used for answers, and a descriptive format for a description problem, and whether or not the binarization processing should be performed is different depending on each answer format. For example, in the case of the mark sheet format, there is a fear that correction of the scanned image by performing the above-described binarization processing may cause an erroneous determination of a mark, and therefore it is preferable that the binarization processing is not performed. On the other hand, in the case of the descriptive format, since it is easier for a grader to grade answers if the scanned image is corrected such that there remains no trace of erasure by an eraser or the like, it is preferable that the binarization processing is performed. To cope with this, by controlling whether or not to perform the binarization processing, based on the answer format of an answer sheet, it is possible to prevent execution of unnecessary correction unsuitable for the answer format.

Figure 10:
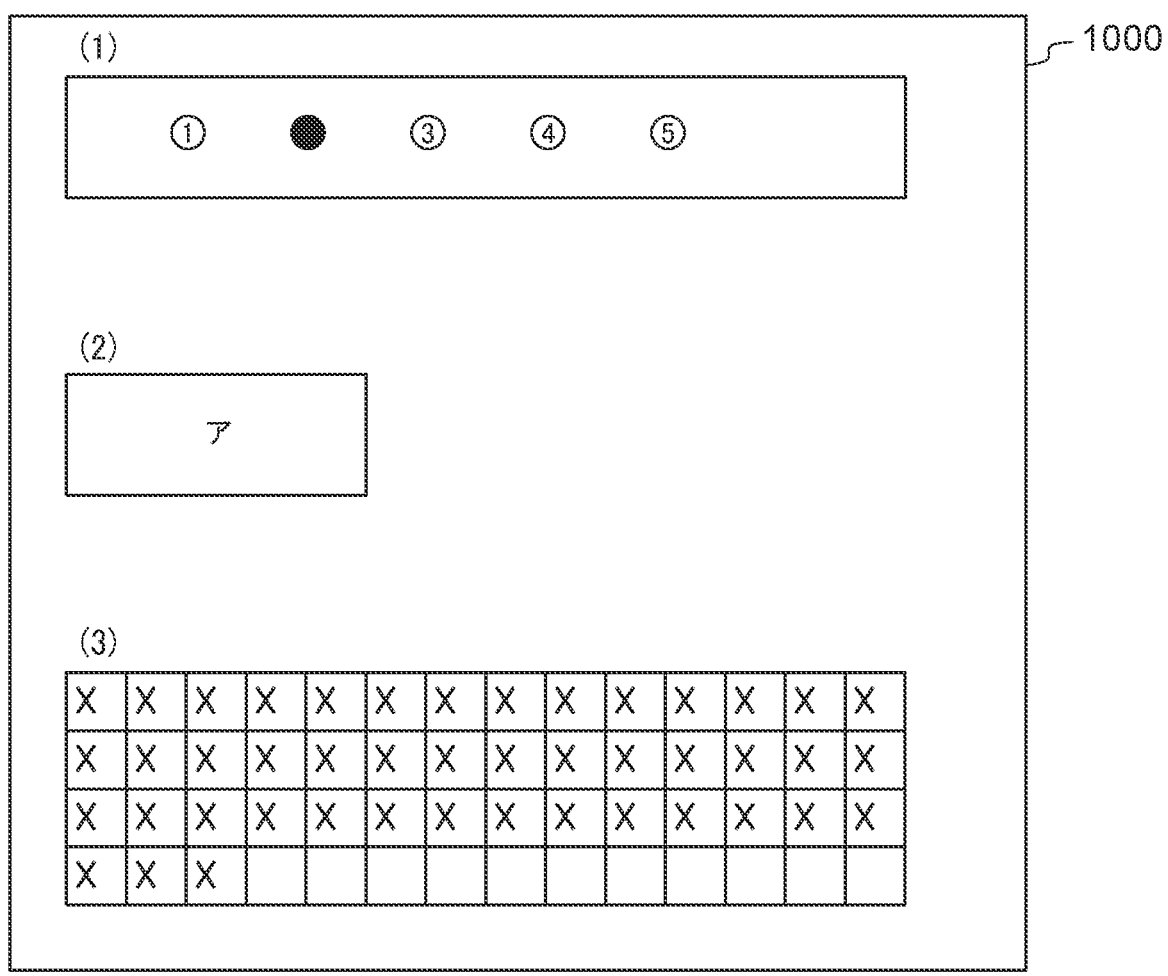
FIG. 10 is a diagram showing an example of an answer sheet on which a plurality of different answer formats are mixed.

Further, in a case where a plurality of different answer formats are mixed as in an answer sheet 1000 in FIG. 10, there is a fear that the mere control of whether or not to perform the binarization processing on each received scanned image causes unnecessary correction unsuitable for the answer formats. To cope with this, whether or not to perform the binarization processing may be controlled on an answer field-by-answer field basis.

Figure 11A:
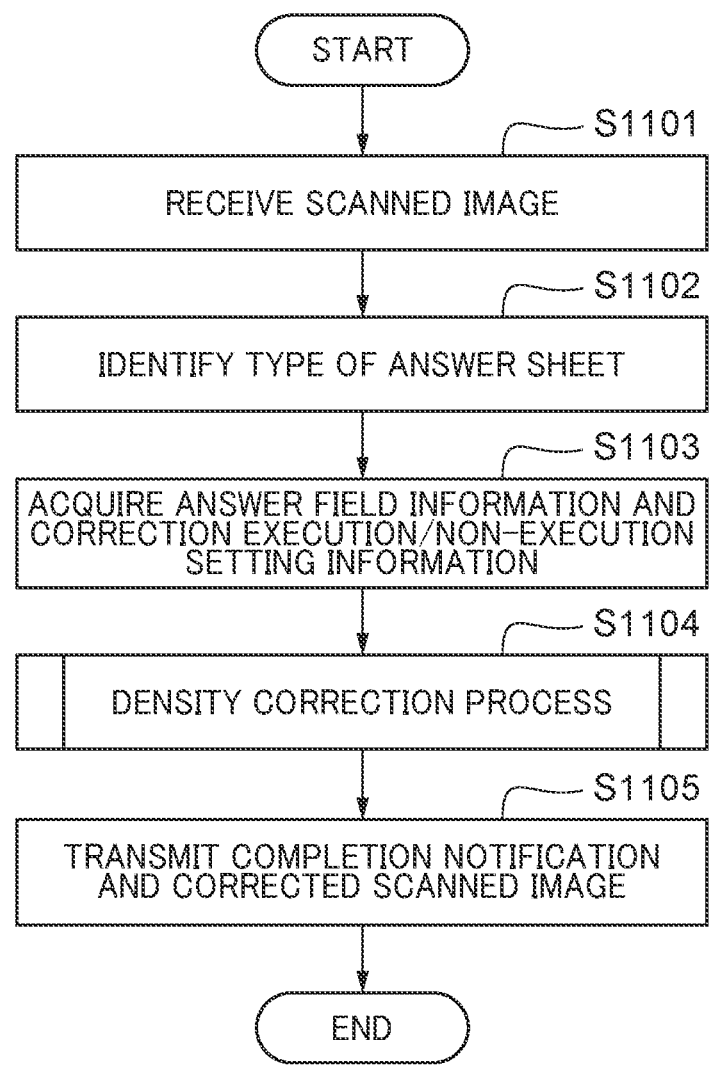
FIG. 11A is a flowchart of another variation of the scanned image correction process in FIG. 5A.

FIG. 11A is a flowchart of another variation of the scanned image correction process in FIG. 5A. Similar to the scanned image correction process in FIG. 5A, the scanned image correction process in FIG. 11A is also realized by the controller 212 of the image processing server 102, specifically, by the CPU that loads a program stored in the ROM into the RAM, and executes the loaded program. Note that the scanned image correction process in FIG. 11A is similar to the scanned image correction process in FIG. 5A, and hence the following description is given particularly of different points from the scanned image correction process in FIG. 5A.

Referring to FIG. 11A, the controller 212 executes steps S1101 and S1102, which are similar to the steps S501 and S502. Then, the controller 212 acquires answer field information and correction execution/non-execution setting information based on the identified type of the answer sheet (step S1103). The correction execution/non-execution setting information includes information indicating the answer format of each answer field, and information indicating whether or not to perform the binarization processing on each answer field. Note that whether or not to perform the binarization processing on each answer field is set in advance by the user. With this, it is possible to cause a user's will to be reflected on the execution of the binarization processing. Then, the controller 212 performs a density correction process in FIG. 11B (step S1104). Then, the controller 212 executes a step S1105 in FIG. 11A, which is similar to the step S505, followed by terminating the scanned image correction process.

Figure 11B:
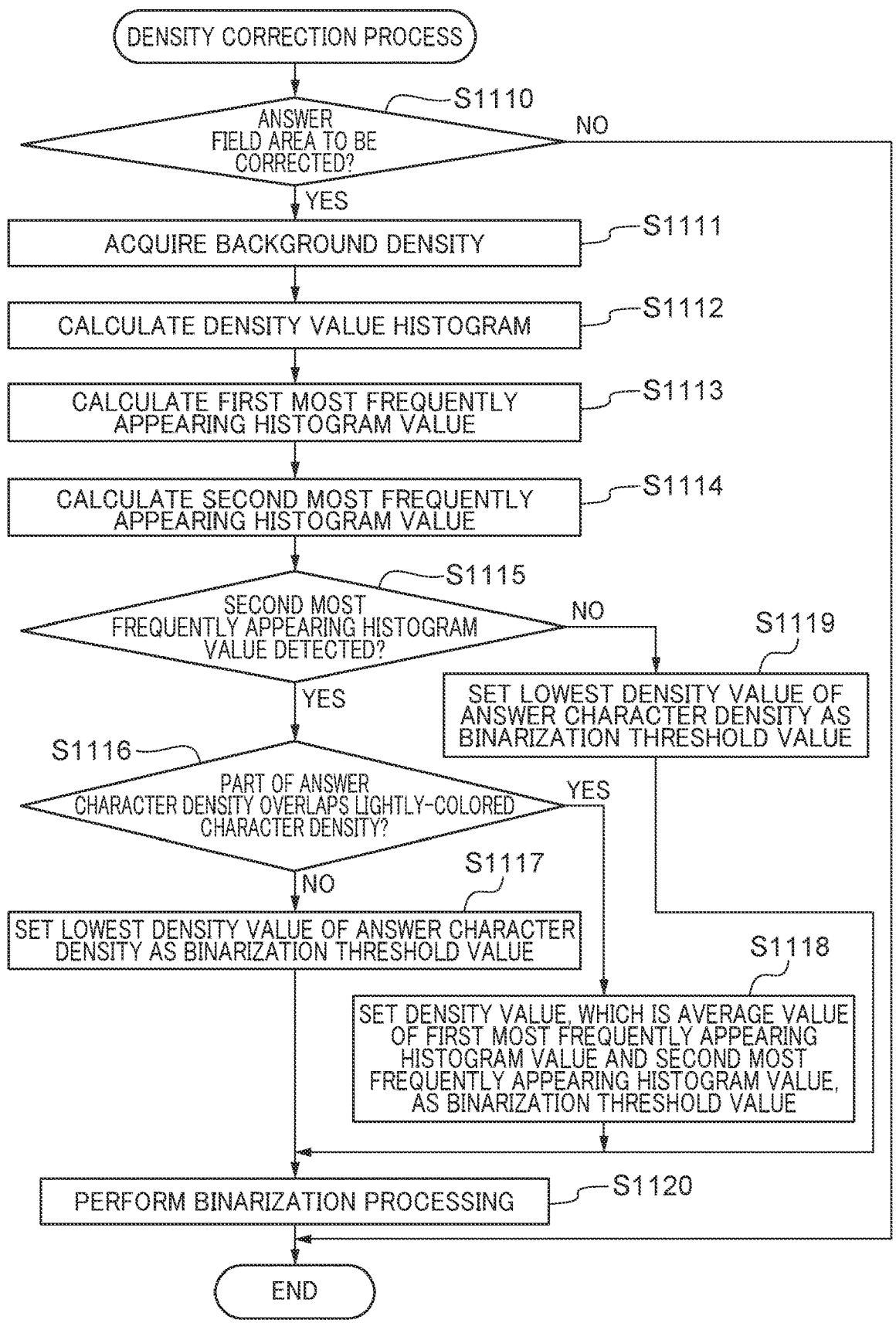
FIG. 11B is a flowchart of another variation of the density correction process, which is performed in a step of the scanned image correction process in FIG. 11A.

Referring to FIG. 11B, in a step S1110, the controller 212 identifies answer field areas of the scanned image received in the step S1101 based on the answer field information acquired in the step S1103, and determines whether or not the identified answer field areas are to be corrected More specifically, in the step S1110, the controller 212 determines based on the correction execution/non-execution setting information whether or not each of the identified answer field areas is to be corrected. The controller 212 executes steps S1111 to S1120, which are similar to the steps S511 to S520, on an answer field area/answer filed areas determined to be corrected in the step S1110. On the other hand, the controller 212 does not execute the steps S1111 to S1120 on an answer field area/answer field areas determined not to be corrected in the step S1110.

As described above, whether or not to perform the binarization processing is controlled for each answer field of the answer sheet, whereby it is possible to positively prevent execution of unnecessary correction unsuitable for the answer formats.

Although in the present embodiment, the description has been given of the configuration in which the image processing server 102 performs the scanned image correction process including the binarization processing, this is not limitative. For example, there may be employed a configuration in which the multifunction peripheral 101 is provided with the density determination section 213 and the density correction section 214, and performs the scanned image correction process including the binarization processing. In such a configuration as well, it is possible to obtain the same advantageous effects as provided by the above-described embodiment.

Further, although in the present embodiment, the description has been given of the case where the scanned image to be subjected to the binarization processing is an image generated by reading an answer sheet, by way of example, the scanned image is not limited to this. For example, the scanned image may be an image generated by reading a document in which unnecessary information lightly remains, as in a handwritten document with a trace of erasure by an eraser or a document with show-through. In such a scanned image as well, it is possible to remove an unnecessary area from the scanned image and thereby make it easy to recognize a necessary area thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-032669 filed Mar. 3, 2022, which is hereby incorporated by reference herein in its entirety.

What is claimed is:

1. An image processing apparatus comprising:
one or more memories that stores instructions; and
one or more processors that causes, by executing the instructions, the image processing apparatus to function as:
a calculation unit configured to calculate a density value histogram based on an acquired scanned image;
a setting unit configured to set a necessary area density that has a predetermined value range around a frequently appearing density value having a highest appearance frequency in the density value histogram, and set a threshold value for binarization based on the necessary area density; and
a control unit configured to control execution of binarization processing for correcting an area of the scanned image, in which density values are equal to or higher than the threshold value, to black, and correcting an area of the scanned image, in which density values are lower than the threshold value, to white,
wherein the scanned image is an image generated by reading an answer sheet,
wherein the control unit controls whether or not to execute the binarization processing based on information indicating an answer format of the answer sheet, and
wherein the control unit controls whether or not to execute the binarization processing, on an answer field-by-an answer field basis, for the answer sheet.

2. The image processing apparatus according to claim 1, wherein the calculation unit calculates the density value histogram based on a difference image obtained by removing ruled line information from the scanned image.

3. The image processing apparatus according to claim 1, wherein the information indicating the answer format of the answer sheet is set by a user.

4. The image processing apparatus according to claim 1, further comprising a reading unit configured to read an answer sheet and thereby generate a scanned image of the answer sheet.

5. The image processing apparatus according to claim 1, further comprising a reception unit configured to receive a scanned image from an apparatus that is provided with a reading unit for reading an answer sheet and thereby generates the scanned image of the answer sheet.

6. A method of controlling an image processing apparatus, comprising:
calculating a density value histogram based on an acquired scanned image;
setting a necessary area density that has a predetermined value range around a most frequently appearing density value having a highest appearance frequency in the density value histogram, and setting a threshold value for binarization based on the necessary area density; and
controlling execution of binarization processing for correcting an area of the scanned image, in which density values are equal to or higher than the threshold value, to black, and correcting an area of the scanned image, in which density values are lower than the threshold value, to white, wherein the scanned image is an image generated by reading an answer sheet, and wherein the method includes controlling whether or not to execute the binarization processing based on information indicating an answer format of the answer sheet, and controlling whether or not to execute the binarization processing, on an answer field-by-an answer field basis, for the answer sheet.

7. A non-transitory computer-readable storage medium storing a program for causing a computer to execute a method of controlling an image processing apparatus, wherein the method comprises:

calculating a density value histogram based on an acquired scanned image;

setting a necessary area density that has a predetermined value range around a frequently appearing density value having a highest appearance frequency in the density value histogram, and setting a threshold value for binarization based on the necessary area density; and controlling execution of binarization processing for correcting an area of the scanned image, in which density values are equal to or higher than the threshold value, to black, and correcting an area of the scanned image, in which density values are lower than the threshold value, to white, wherein the scanned image is an image generated by reading an answer sheet, and wherein the method includes controlling whether or not to execute the binarization processing based on information indicating an answer format of the answer sheet, and controlling whether or not to execute the binarization processing, on an answer field-by-an answer field basis, for the answer sheet.

* * * * *